United States Patent
Silva et al.

(10) Patent No.: US 8,518,176 B2
(45) Date of Patent: Aug. 27, 2013

(54) SUPPRESSION OF ANTAGONISTIC HYDRATION REACTIONS IN BLENDED CEMENTS

(75) Inventors: Denise A. Silva, Arlington, MA (US); Josephine Cheung, Lexington, MA (US); Paul Sandberg, Beverly, MA (US); Lawrence Roberts, Acton, MA (US); Durga V. Subramanian, Lexington, MA (US); John L. Gallagher, Bollingham, MA (US); Lawrence L. Kuo, Acton, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 95 days.

(21) Appl. No.: 13/119,306

(22) PCT Filed: Oct. 30, 2009
(Under 37 CFR 1.47)

(86) PCT No.: PCT/US2009/062712
§ 371 (c)(1),
(2), (4) Date: Aug. 17, 2011

(87) PCT Pub. No.: WO2010/074811
PCT Pub. Date: Jul. 1, 2010

(65) Prior Publication Data
US 2012/0298011 A1    Nov. 29, 2012

Related U.S. Application Data

(60) Provisional application No. 61/140,341, filed on Dec. 23, 2008.

(51) Int. Cl.
*C04B 18/06*    (2006.01)

(52) U.S. Cl.
USPC .................................. 106/705; 106/DIG. 1

(58) Field of Classification Search
USPC ............................................ 106/705, DIG. 1
See application file for complete search history.

(56) References Cited

U.S. PATENT DOCUMENTS

| 2,564,690 | A | 8/1951 | Havelin et al. |
| 2,606,127 | A | 8/1952 | Weber |

(Continued)

FOREIGN PATENT DOCUMENTS

| CS | 250633 | 4/1987 |
| DE | 3411010 | 9/1984 |
| JP | 1964-4866 | 4/1964 |

OTHER PUBLICATIONS

Paul Sandberg and Lawrence R. Roberts, "Cement-Admixture Interactions Related to Aluminate Control," Journal of ASTM Intern., Jun. 2005, vol. 2, No. 6.

(Continued)

*Primary Examiner* — Paul Marcantoni
(74) *Attorney, Agent, or Firm* — Craig K. Leon; Stephan P. Williams

(57) ABSTRACT

Method for suppressing antagonistic hydration reactions in Portland fly ash cement involves the use of unponded fly ash that is pre-hydrated, preferably as an aqueous slurry wherein fly ash, preferably having an alkaline earth metal oxide of at least 10% by weight, is soaked, whereby the hydration reaction of the resultant mixed fly ash and cement is accelerated when these components are mixed together with water to hydrate the cement. Blended Portland cement/fly ash compositions of the invention will also have higher early strength as well as shorter set time compared to untreated blends.

22 Claims, 5 Drawing Sheets

(56) References Cited

U.S. PATENT DOCUMENTS

| | | |
|---|---|---|
| 2,987,408 A | 6/1961 | Minnick |
| 3,634,115 A | 1/1972 | Minnick |
| 3,765,920 A | 10/1973 | Humphrey |
| 3,852,084 A | 12/1974 | Webster et al. |
| 3,959,004 A | 5/1976 | Stryker |
| 4,019,918 A | 4/1977 | Wills, Jr. |
| 4,105,463 A | 8/1978 | Angelbeck |
| 4,210,457 A | 7/1980 | Dodson et al. |
| 4,250,134 A | 2/1981 | Minnick |
| 4,336,069 A | 6/1982 | Dodson et al. |
| 4,397,801 A | 8/1983 | Minnick |
| 4,514,307 A | 4/1985 | Chestnut et al. |
| 4,659,385 A | 4/1987 | Costopoulos et al. |
| 4,871,283 A | 10/1989 | Wright |
| 4,877,453 A | 10/1989 | Loggers |
| 4,979,990 A | 12/1990 | Smart |
| 5,160,539 A | 11/1992 | Cochran |
| 5,232,496 A | 8/1993 | Jennings et al. |
| 5,286,430 A | 2/1994 | Downs et al. |
| 5,401,538 A | 3/1995 | Perito |
| 5,416,252 A | 5/1995 | Sorrentino et al. |
| 5,435,843 A | 7/1995 | Roy et al. |
| 5,676,905 A | 10/1997 | Andersen et al. |
| 5,681,384 A | 10/1997 | Liskowitz et al. |
| 5,732,363 A | 3/1998 | Suzuki et al. |
| 5,830,305 A | 11/1998 | Andersen et al. |
| 5,879,722 A | 3/1999 | Andersen et al. |
| 6,008,275 A | 12/1999 | Moreau et al. |
| 6,334,895 B1 | 1/2002 | Bland |
| 6,419,620 B1 | 7/2002 | Rao et al. |
| 6,517,631 B1 | 2/2003 | Bland |
| 6,907,994 B2 | 6/2005 | Bradley et al. |
| 7,048,793 B2 | 5/2006 | Chun et al. |
| 7,390,444 B2 | 6/2008 | Ramme et al. |
| 7,407,546 B2 | 8/2008 | Hill et al. |
| 7,410,537 B2 | 8/2008 | Kumar et al. |
| 7,736,430 B2 | 6/2010 | Barron et al. |
| 2006/0281835 A1 | 12/2006 | Ong |
| 2007/0049679 A1 | 3/2007 | Kuroyannagi |
| 2007/0215353 A1 | 9/2007 | Barron et al. |
| 2008/0302277 A1 | 12/2008 | Naji et al. |

OTHER PUBLICATIONS

Paul Sandberg and Lawrence R. Roberts, "Studies of Cement—Admixture Interactions Related to Aluminate Hydration Control by Isothermal Calorimetry", before at least 2008.

Sumio Horiuchi et al. "Effective Use of Fly Ash Slurry as Fill Material" (Journal of Hazardous Materials 76 (2000) 301-337).

S. Tsimas, et al. "High-Calcium Fly Ash as the Fourth Constituent in Concrete: Problems, Solutions, and Perspectives," Cement & Concrete Composites 27 (2005) 231-237.

V. Tim Cost, "Incompatibility of Common Concrete Materials—Influential Factors, Effects, and Prevention", 2006 Concrete Bridge Conference: HPC: Build Fast, Build to Last.

Dave Suchorski, "Durability Without Delay, Processing Improves Class F Fly Ash Reactivity", Concrete International, Jan. 2007, ppl 67-68.

Yang Kerui, et al. "The Influence of Calcium Lignosulphonate-sodium bicarbonate on the Status of Ettringite Crystallization in Fly Ash Cement Paste," Cement and Concrete Research 32 (2002) 51-56.

S. K. Antiohos, et al., "A Novel Way to Upgrade the Coarse Part of a High Calcium Fly Ash for Reuse into Cement Systems," Waste Management 27 (2007) 675-683.

Lawrence R. Roberts, et al., "Understanding Cement-SCM-Admixture Interaction Issues," Concrete International, Jan. 2007, p. 33-41.

SUPPRESSION OF ANTAGONISTIC HYDRATION REACTIONS IN BLENDED CEMENTS

This application claims the benefits of the filing dates of U.S. Provisional Application No. 61/140,341, filed on Dec. 25, 2008, and of International Application No. PCT/US09/62712, filed Oct. 30, 2009.

FIELD OF THE INVENTION

The present invention relates to fly ash blended hydraulic cements and concrete or mortars made from blends of Portland cement and fly ash, and more particularly to a novel method for suppression of antagonism or interference between the Portland cement hydration reaction and the fly ash hydration reaction, and compositions made by such method.

BACKGROUND OF THE INVENTION

Portland cement may be prepared by sintering a mixture of components including calcium carbonate (as limestone), aluminum silicates (as clay or shale), silicon dioxide (as sand) and miscellaneous iron oxides. During the sintering process, chemical reactions take place wherein hardened nodules, commonly called clinker, are formed. Portland cement clinker is formed by the reaction of calcium oxide with acidic components to give primarily tricalcium silicate (designated by cement chemists as "$C_3S$"), dicalcium silicate ("$C_2S$"), tricalcium aluminate ("$C_3A$"), and a ferrite solid solution phase in which tetracalcium aluminoferrite ("$C_4AF$") is present. The hydration of Portland cement with water is a complex process having different reactions among its primary components ($C_3S$, $C_2S$, $C_3A$ and $C_4AF$). Some of these reactions occur at different times and may interfere with each other.

The production of Portland cement is energy intensive and releases carbon dioxide into the atmosphere. In an effort to reduce costs and carbon dioxide emissions, the concrete industry has increasingly used supplementary cementitious materials ("SCM"), such as fly ash. The production of SCM blended cements requires less energy and emits less carbon dioxide than Portland cement, because part of the Portland cement is replaced by SCM. Similarly, concrete produced with a blend of Portland cement and SCM embodies less energy and less production of $CO_2$ than a concrete produced with Portland cement alone.

Thus, cements are increasingly produced having large amounts of SCM such as fly ash, which is a byproduct of coal manufacture. Fly ash is often used for blending with cements. It is able to contribute to the formation of the calcium silicate hydrates when blended with Portland cement. Preferred fly ashes for early strength development are those having high levels of calcium. In the United States, these fly ashes are classified as ASTM Class C fly ash.

The modern concrete industry continues to replace an increasing fraction of Portland cement with fly ash. The replacement level is approaching 30% and higher, because the growing concern is to reduce cost and carbon dioxide emission.

Unfortunately, the more reactive fly ashes, such as ASTM Class C fly ashes, are known sometimes to impact adversely the hydration of Portland cement, particularly, where the fly ash is used at levels around 20% or more. As these fly ashes are rich in calcium and aluminum, their use requires the sulfate ions supplied by Portland cement. As higher levels of Portland cement are replaced by Class C fly ash either in the cement or later in concrete or mortar production, the greater is the risk that the hydrating cement composition will become sulfate deficient. Class F fly ashes have a lower risk because their lower calcium content causes lower reaction rates.

While addition of sulfate materials (e.g., calcium sulfate) to blended cements having Class C fly ash can often restore hydration rates, thereby preventing abnormal set retardation and loss of early strength, such mixtures often do not respond favorably to chemical admixtures such as certain water reducing agents and non-chloride accelerating agents that are commonly used in the industry. A commonly found problem is an extended set retardation and slower than expected strength development. Set retardation and loss of early strength are undesirable because these generate delays and increase costs.

It is an objective of the present invention to provide novel methods for resolving the problems created by fly ashes, and in particular ASTM Class C fly ash and other calcium-containing fly ashes, such that use of such fly ashes in a blended cement or in the production of concrete or mortar does not substantially impair the desired hydration of the Portland cement fraction of the blended cement mixture.

SUMMARY OF THE INVENTION

In surmounting the problems of the prior art, the present invention provides a novel and inventive method for suppressing antagonistic hydration reactions of Portland cement and fly ash in blended cement, as well as compositions produced by the method.

An exemplary method of the present invention for making a blended fly ash Portland cement composition, comprises: mixing together (A) Portland cement and (B) pre-hydrated, unponded fly ash in a cement to fly ash ratio (C:FA) of 95:5 to 21:79 by dry weight to obtain a mix; said Portland cement and pre-hydrated, unponded fly ash mix comprising a source of soluble sulfate in an amount sufficient to sustain hydration of the Portland cement when water is added to said mix to initiate hydration of said Portland cement; said pre-hydrated, unponded fly ash having a total alkaline earth metal content, when expressed in terms of molar equivalent of calcium oxide, of at least 10% based on total weight of said fly ash; and said pre-hydrated, unponded fly ash being pre-hydrated (i) by mixing said unponded fly ash in a body of water to obtain a fly ash slurry, the amount of said body of water being at least 10% by weight of said fly ash to allow partial or total dissolution of unhydrated, reactive calcium aluminate-containing phases and partial or total precipitation of calcium-containing hydrates; and (ii) allowing said fly ash to soak in said body of water, being at least 10% by weight of said fly ash, to allow said water-soaking fly ash to undergo peak exothermic reaction generated by the partial or total dissolution of reactive calcium aluminate-containing phases and partial or total precipitation of calcium-containing hydrates within said body of soaking water.

The description of the foregoing exemplary method takes into account that Portland cements and fly ashes typically comprise a source of soluble sulfate (e.g. gypsum in Portland cement) needed for hydration of the Portland cement. It is possible, however, that when large amounts of fly ash are employed, the level of soluble sulfate will need to be supplemented by additional sources of soluble sulfate. Hence, in further exemplary methods of the invention require that an additional source of soluble sulfate be added. Thus, calcium sulfate dihydrate (gypsum), or, more preferably, calcium sulfate hemihydrate (plaster of Paris) may be incorporated into the cement fly ash mix. The sulfate source can be added during the mixing of cement and fly ash, or more preferably by adding it before or during the pre-hydration of the unponded fly ash.

The term "soaking" as employed in this invention is intended to denote full immersion of fly ash within a mass or "body" of water. The amount of soaking water should be at least ten percent (10%) of the weight of the fly ash being soaked, and more preferably should be at least twenty percent (20%) or more of the weight of the fly ash. Through full-bodied immersion in a body of water, the fly ash particles are intimately contacted with water, so that the early reactive elements of the fly ash particles are substantially hydrated to the point at which it undergoes exothermic reaction and surpasses an exothermic peak. This state of substantial hydration may be confirmed by isothermal or semi-adiabatic calorimetry.

The inventors surprisingly discovered that if the fly ash is allowed to "pre-hydrate" (or hydrate in the presence of water added to the fly ash before water is added hydrate the Portland cement with which the fly ash will ultimately be combined) to the point of maximum exothermic reaction, as may be confirmed by calorimetric measurement, this will prevent or minimize interference between the "pre-hydrated" fly ash and the (subsequent) hydration of the Portland cement with which the "pre-hydrated fly ash is blended. The exothermic peak of the pre-hydrated fly ash is mainly due to the hydration reactions of reactive calcium aluminate-containing phases in the fly ash which, upon contact with the water, dissolve and release ions into solution. Calcium-containing phases and sulfate containing-phases also contribute for the intensity of the exothermic peak of the pre-hydrated fly ash.

In further exemplary embodiments, the dissolution and precipitation of calcium-containing hydrates can be followed by determining the ionic concentration of ions such as calcium, aluminum, sulfate, sodium, and potassium in the water used for "pre-hydrating" the fly ash. The "pre-hydration" time (i.e., during which the fly ash in water attains peak exothermic reaction at a point) can be determined by measuring concentration of calcium ion in solution and ascertaining when the calcium concentration substantially decreases and then stabilizes in the solution, thus indicating that precipitation of calcium-containing hydrates has been initiated.

In one exemplary embodiment of the invention, the Portland cement can be hydrated upon mixing with the pre-hydrated, unponded fly ash, if the fly ash is combined in the form of the fly ash slurry which contains the body of water used for "pre-hydrating" the fly ash. Alternatively, the fly ash slurry, in which peak exothermic reaction has been attained, may be heated to evaporate the body of water used for "pre-hydrating" the fly ash, such that the calcium-containing hydrates are precipitated between fly ash particles and/or onto the surface of resultant dried fly ash particles as calcium- and magnesium-containing salts. The "pre-hydrated" fly ash along with the dried hydrates can be mixed conveniently in dry powder form into the Portland fly ash cement blend. Thus, an exemplary embodiment of the present invention comprises a Portland fly ash cement blend comprising the "pre-hydrated," unponded fly ash and a hydratable Portland cement.

In further embodiments of the invention, the "pre-hydration" of fly ash comprises soaking an unponded fly ash that comprises 0-15% free lime (calcium oxide) and more preferably comprises 0-1% free lime (by dry weight).

Portland cement/fly ash compositions of the present invention, formed by the exemplary method described herein, will have enhanced set acceleration and early strength when compared to compositions in which hydration reactions of the fly ash and Portland cement are allowed to occur simultaneously.

Further advantages and features of the invention will be described in further detail hereinafter.

BRIEF DESCRIPTION OF THE DRAWINGS

An appreciation of benefits and features of the present invention may be more readily appreciated by considering the following written description of exemplary embodiments in conjunction with the drawings, wherein.

DETAILED DESCRIPTION OF EXEMPLARY EMBODIMENTS

Figure 1:
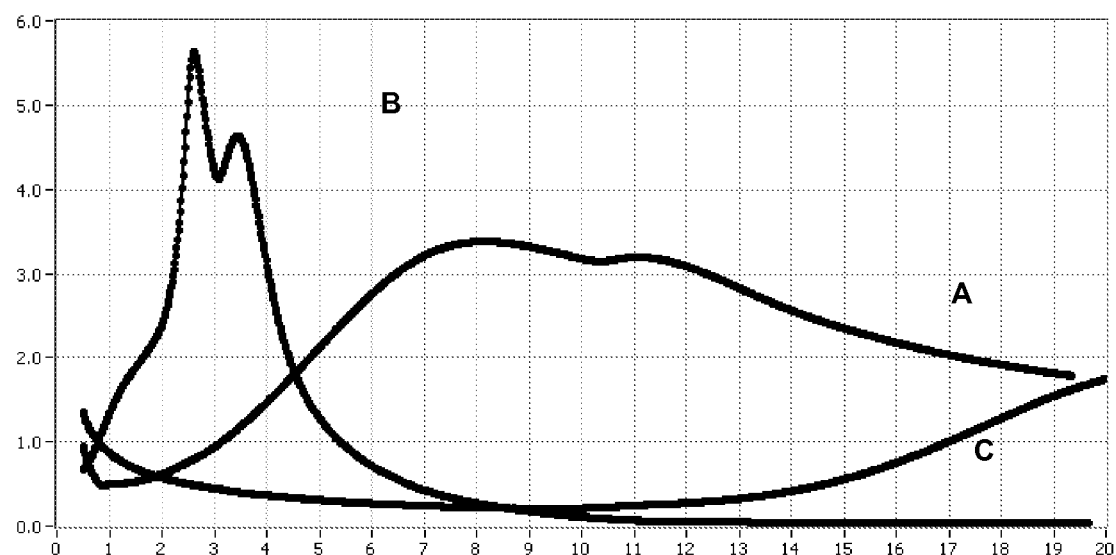
FIG. 1 is a representative graphic illustration of hydration behavior, in terms of heat evolution versus time, of a Class C fly ash sample (curve designated as "B"), a Portland cement sample (curve "A"), and a blend of fly ash and cement (curve "C") (PRIOR ART)

The term "Portland cement" as used herein means the general composition as generally described in the Background section. This term includes hydratable cement which is produced by pulverizing clinker consisting of hydraulic calcium silicates and aluminates and one or more forms of calcium sulfate (e.g., gypsum) as an interground additive.

The term "Portland cement/fly ash compositions" as used herein refers to a blend of ordinary Portland cement and fly ash, achieved either by intergrinding or interblending, or to compositions such as mortars and concretes containing both Portland cement and fly ash.

The term "cementitious" as used herein refers to materials that comprise Portland cement or which otherwise function as a binder to hold together fine aggregates (e.g., sand), coarse aggregates (e.g., crushed gravel), or mixtures thereof.

The term "mortar" as used herein will typically refer to a cement or cementitious material in combination with a fine aggregate, such as sand, and water; while the term "concrete" will refer to a mortar further comprising a coarse aggregate such as crushed gravel.

The term "hydratable" as used herein is intended to refer to cement or cementitious materials that are capable of being hardened or cured by chemical interaction with water. Portland cement clinker is a partially fused mass primarily composed of hydratable calcium silicates and aluminates. The calcium silicates are essentially a mixture of tricalcium silicate (3CaO.SiO$_2$ "C$_3$S" in cement chemists notation) and dicalcium silicate (2CaO.SiO$_2$, "C$_2$S") in which the former is the dominant form, with lesser amounts of tricalcium aluminate (3CaO.Al$_2$O$_3$, "C$_3$A") and tetracalcium aluminoferrite (4CaO.Al$_2$O$_3$.Fe$_2$O$_3$, "C$_4$AF"). See e.g., Dodson, Vance H., *Concrete Admixtures* (Van Nostrand Reinhold, New York N.Y. 1990), page 1.

All four phases of Portland cement (which were designated respectively in the Background as C$_3$S, C$_2$S, C$_3$A and C$_4$AF primary component phases) evolve heat when they react with water (and calcium sulfate), and this chemical reaction, which leads to hardening and development of strength, is called hydration; and the heat generated during the course of the reaction is called heat of hydration. See Dodson supra, page 10.

The term "fly ash" as used herein shall mean "finely divided residue that results from the combustion of ground or powdered coal and that is transported by flue gasses." This definition is consistent with that set forth in ASTM C618-05 (paragraph 3.1.2). The ASTM specification describes two Classes of fly ash for use as a mineral admixture in Portland cement concrete. Class F fly ash is normally produced by burning anthracite or bituminous coal. It is described as having pozzolanic properties. Class C fly ash is normally produced by burning lignite or sub-bituminous coal. It has more cementitious properties than Class F fly ash, primarily due to its higher calcium content. Because of the more cementitious properties of Class C fly ash, it bonds more strongly than Class F fly ash when combined with water and allowed to harden. While certain Class F fly ashes are believed suitable for use in the present invention, Class C fly ashes are believed to present the greatest hydration interference or "antagonism" with hydration of Portland cement.

As mentioned above, it is one of the purposes of this invention to reduce and/or to prevent the antagonism between hydration reactions of ordinary Portland cement and an unponded fly ash, especially Class C fly ash, in order to obtain a Portland fly ash cement blend having hydration behavior that is not hindered or suppressed by such antagonism.

The term "pre-hydrated" when used to refer to a fly ash treated in accordance with the invention shall mean an unponded fly ash that is hydrated by immersing and soaking it in water, such that it initiates an exothermic reaction and reaches an exothermic peak, before the fly ash is mixed with a hydratable, Portland cement to obtain the Portland cement/fly ash compositions of the invention.

The term "unponded" as used herein refers to fly ash that is captured as a flue waste product in a coal combustion plant and stored in powdered form, such as in a silo or bulk container, rather than being submerged in a storage pond (which is located on or near the plant premises). Class C fly ashes that are ponded are generally useless as cementitious materials for purposes of the present invention in their ponded form, because they are, for the most part, fused into an unworkable mass; and, even if recovered and ground into a powder and mixed with cement, such ponded fly ash will otherwise function mostly as an inert filler (or substitute for aggregate) rather than as supplementary cementitious binder material when combined with Portland cement. Moreover, the fly ash and pond water are both susceptible to environmental contamination, with the pond water being vulnerable to chemical pollution, leaching, evaporation, influx from ground water sources, and other factors that greatly affect the presence, concentration, and balance of chemical constituents. Thus, the present inventors refer to fly ashes suitable for making exemplary Portland fly ash cement blends of the present invention as "unponded."

As shown in FIG. 1 (PRIOR ART), the heat evolved from various material samples upon mixing with water can be measured by isothermal heat flow calorimetry over time. The vertical (y) axis of the graph represents the amount of heat evolved from the sample in terms of milliwatts per gram of cementitious material present in the sample; whereas the horizontal (x) axis represents time in hours elapsed after the sample and water are mixed. The heat evolved from a sample containing Portland cement alone is designated as curve "A." The heat evolved from a sample that contains only (unponded) fly ash alone is designated as curve "B"; and the heat evolved from a blend of the fly ash and Portland cement, mixed together in a 1:1 dry weight ratio and hydrated at the same time together is depicted in the curve designated as "C."

The fly ash of curve B in FIG. 1 demonstrates a very high rate of heat evolution within the very first few hours after mixing with water. The heat evolved from Portland cement of curve A reaches a heat evolution peak nearly four hours after the exothermic peak reached by the fly ash of curve B. In other words, the sample of fly ash alone (B) is seen to reach exothermic peaks at 2-4 hours after mixing with water, whereas the sample of Portland cement alone (A) is seen to reach exothermic peak about 7-12 hours after mixing with water.

However, as seen in curve "C" in FIG. 1, the blend of fly ash and Portland cement demonstrates a severe retardation of reaction, because the peaking of heat evolution occurs well after the exothermic peaks of the separate samples. In other words, curve C does not begin to show significant exothermic levels until about 15-16 hours after the Portland fly ash cement blend is mixed with water, and until after the exothermic activity of Portland cement alone (curve "A") has reached its peak and has begun noticeably to decrease.

Curve C of FIG. 1 confirms the hypothesis of the present inventors that the hydration reactions of ordinary Portland cement and fly ash are antagonistic because they conflict with, and suppress, each other.

Without being bound by theory, the present inventors believe that the antagonism partly or wholly exists because the hydration of the fly ash is much quicker and generates calcium aluminate hydrates that precipitate onto the surface of the cement particles to prevent or to hinder the hydration reaction of the cement; whereas the cement particles release, into the surrounding aqueous environment, silicate ions that precipitate as hydrates on the surface of the fly ash surface, thus hindering fly ash hydration.

Another possible explanation for the suppression of heat evolution in blended (untreated) fly ash and cement is that each of these components, during dissolution in their common aqueous environment, emits ions that interfere with the ionization of materials required by the other for hydration.

Figure 2:
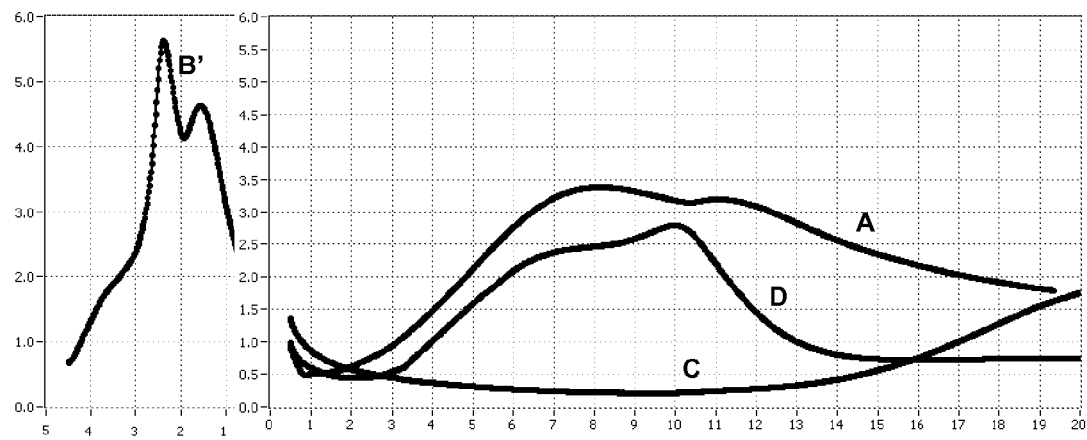
FIG. 2 is split graphic illustration of the hydration behavior of Class C fly ash that is "pre-hydrated" (i.e., hydrated by introducing water to the fly ash without the Portland cement sufficient for the fly ash to reach peak exothermic state) using an exemplary method of the present invention (curve "B") before hydration of Portland cement (curve "A") occurs, such that the resultant blend of cement and fly ash demonstrates hydration behavior (curve "D") that is quite different from the PRIOR ART curve "C" of FIG. 1.

As shown in FIG. 2, the present invention provides a method whereby the supplemental cementitious material (e.g., fly ash) is pre-hydrated such that, when mixed with Portland cement and water, the hydration reaction of Portland cement, when water is added to the Portland cement/fly ash composition, is not hindered or suppressed by antagonistic causes (because the fly ash is pre-hydrated). FIG. 2 is a composite graph that illustrates hydration reaction of an unponded fly ash (curve "B") that is immersed in water for approximately five hours before Portland cement is added to the fly ash. Curve "A" represents the hydration reaction profile of Portland cement alone when mixed with water; whereas curve "D" represents the hydration reaction profile when the Portland cement is mixed with the fly ash whose pre-hydration reaction profile is shown as curve "B." As illustrated by curve "D", hydration begins to peak 3-4 hours after the pre-hydrated fly ash is combined with the cement, and displays a highly pronounced exothermic peak at 6-11 hours.

The exothermic behavior of the blend of pre-hydrated fly ash and Portland cement (curve "D") is surprising and remarkable when considered against the lack of exothermic peak shown by curve "C" (shown in FIG. 1 and also shown in FIG. 2 for comparative purposes). Curve "D" has heat evolution peaks of 2.0 to 3.0 milliwatts/gram; whereas curve ""C" is substantially flat during this time period and does not begin to show any substantial exothermic activity until about 15-16 hours after water has been added to the blend of untreated fly ash and cement.

Thus, an exemplary method of the present invention for making a blended fly ash Portland cement composition, comprises: mixing together (A) Portland cement and (B) pre-hydrated, unponded fly ash in a cement to fly ash ratio (C:FA) of 95:5 to 21:79, and more preferably 85:15 to 25:75, by dry weight to obtain a mix; said Portland cement and pre-hydrated, unponded fly ash mix comprising a source of soluble sulfate in an amount sufficient to sustain hydration of the Portland cement when water is added to said mix to initiate hydration of said Portland cement; said pre-hydrated, unponded fly ash having a total alkaline earth metal content, when expressed in terms of molar equivalent of calcium oxide, of at least 10% based on total weight of said fly ash; and said pre-hydrated, unponded fly ash being pre-hydrated (i) by mixing said unponded fly ash in a body of water to obtain a fly ash slurry, the amount of said body of water being at least 10% by weight of said fly ash to allow partial or total dissolution of unhydrated, reactive calcium aluminate-containing phases and partial or total precipitation of calcium-containing hydrates; and (ii) allowing said fly ash to soak in said body of water, being at least 10% by weight of said fly ash, to allow said water-soaking fly ash to undergo peak exothermic reaction generated by the partial or total dissolution of reactive calcium aluminate-containing phases and partial or total precipitation of calcium-containing hydrates within said body of soaking water.

As previously mentioned in the summary of the invention, Portland cements and fly ashes each typically contain some sulfate content. Portland cements are formed from a combination of gypsum and clinker in accordance with set standards such as ASTM C150 as well as comparable standards in other countries. Normally, the amount of gypsum (calcium sulfate dihydrate) included in the mix is sufficient to give up to 4.5% $SO_3$ content to the mix. Where high levels of fly ash are employed, however, the level of soluble sulfate may be insufficient for driving the hydration of Portland cement when water is added to the Portland cement fly ash blend. Thus, in further exemplary embodiments of the invention, a soluble source of sulfate is added to the Portland cement/fly ash composition. Preferably, the source of sulfate is added to the fly ash or fly ash slurry before mixing with the Portland cement, so as to ensure that ettringite is the most stable aluminate hydrate formed. The present inventors believe that this improves the performance of water reducing admixtures that are added or admixed with the Portland cement. If the level of soluble sulfate is deficient when the fly ash is pre-hydrated, this may cause the formation of so-called "AFm" phases which are known to cause loss of dispersant efficiency in the resultant cementitious composition.

Exemplary sources of soluble sulfate comprise sodium sulfate, potassium sulfate, calcium sulfate (in the form of anhydrite, plaster of Paris, gypsum, or a mixture thereof), or mixtures thereof. Thus, further exemplary methods of the present invention comprise adding a source of soluble sulfate to the mix of Portland cement and fly ash. Preferably the source of soluble sulfate is added during or before said mixing together of the unponded fly ash and Portland cement; and, most preferably, the source of soluble sulfate is added to the fly ash during or before it is pre-hydrated, such as part of the water in which the fly ash water is soaked.

In further exemplary methods of the present invention, the mixing of pre-hydrated, unponded fly ash and Portland cement comprises using the water used for soaking (or "pre-hydrating") the fly ash. Thus, for example, the fly ash can be pre-hydrated by creating an aqueous fly ash slurry, and then combining the Portland cement with the fly ash slurry (which thus contains the water used for soaking or "pre-hydrating" the fly ash). Additional water can be added for purposes of ensuring complete hydration of the Portland cement and workability of mortar or concrete.

The fly ash is preferably soaked in the dissolving water for a period of time that is sufficient to allow the fly ash to undergo peak exothermic reaction generated by the partial or total dissolution of reactive calcium aluminate-containing phases and partial or total precipitation of calcium-containing hydrates.

In further exemplary embodiments, the dissolving water in the fly ash slurry can be removed by evaporation such as by application of heat at a point in time after precipitation of calcium-containing hydrates is initiated, whereby the fly ash particles, dried by evaporation but nevertheless containing the ionic species that have been dissolved out by the water that is evaporated, can be mixed directly with the Portland cement. The present invention thus also concerns Portland cement/fly ash compositions made by the exemplary methods of the invention as described herein. As previously mentioned, exemplary methods and compositions of the invention further comprise the addition of a soluble sulfate, which is preferably added before or during mixing together of the Portland cement and pre-hydrated, unponded fly ash.

In still further exemplary embodiments of the invention, a source of soluble carbon is incorporated into the mixing of the Portland cement and pre-hydrated, unponded fly ash. The source of soluble carbon comprises a carbonate, a bicarbonate, or mixture thereof. Thus, in exemplary methods and compositions of the invention, the source of soluble carbon is alkaline earth metal bicarbonate selected from the group consisting of sodium bicarbonate and potassium bicarbonate. Alternatively, the source of soluble carbon can be carbon dioxide, which can be introduced in the form of a gas that is bubbled into the water used for pre-hydrating the fly ash and creating the pre-hydrated fly ash slurry, and/or bubbled into water used for hydrating the Portland cement in the Portland fly ash blended composition. For example, the alkaline earth metal bicarbonate may also comprise calcium, magnesium, or mixture thereof.

The pre-hydration of the fly ash and the mixing of the pre-hydrated fly ash and Portland cement may occur at heated temperature or, more preferably, at ambient temperature.

Further exemplary methods and compositions of the invention, the mixing of the Portland cement and pre-hydrated, unponded fly ash or a hydraulic cement comprising a mixture of Portland cement and pre-hydrated, unponded fly ash can further comprise one or more admixtures selected from the group consisting of a cement dispersant, a superplasticizer, a shrinkage reducing admixture, a viscosity modifying agent, a corrosion inhibiting admixture, an air entraining agent, an air detraining agent, a set accelerating agent, a set retarding agent. Such admixtures and their amounts will be within the knowledge of skilled artisans.

An exemplary process of the invention further comprises adding at least one set retarder to the fly ash slurry and Portland cement. For example, the at least one set retarder can be added to the pre-hydrated, unponded fly ash before the pre-hydrated, unponded fly ash is made into a slurry and mixed with said Portland cement. Alternatively, the one or more set retarders may be incorporated into the fly ash during or after it is converted from the pre-hydrated, unponded dry powder state into a slurry (after allowing the pre-hydrated, unponded fly ash to soak in an amount of water which is at least 10% by weight of the fly ash thus allowing partial or total dissolution of unhydrated, reactive calcium aluminate-containing phases and partial or total precipitation of calcium-containing hydrates), thereby allowing for control of the hydration and rheology (and thus consistency) of the fly ash slurry before it is mixed with the cement. In any event, it is preferred to introduce the one or more set retarders into the dry powder fly ash. If one or more set retarders are added during or after formation of the (wet) fly ash slurry, then it is desirable that this addition be completed before the fly ash becomes water-soaked and undergoes peak exothermic reaction generated by the partial or total dissolution of reactive calcium aluminate-containing phases and partial or total precipitation of calcium-containing hydrates within the fly-ash-soaking water.

Exemplary set retarders believed to be suitable for use in the present invention include, without limitation, conventional set retarders, such as certain acids (e.g., carboxylic acids) and their salts (e.g., ammonium, alkali, alkaline earth, trivalent, and transition metals). These include gluconic acid (e.g., in the form of sodium gluconate), glucoheptonic acid, citric acid, tartaric, lignosulfonic acids (e.g., sodium lignosulfonate), acetic acid, carbonic acid, boric acid phosphonic acid, lactic acid, sulfonic acid, thiosulfonic acid, and benzoic acids, as well as their salts and derivatives. Exemplary set retarders also include sugars and starches (e.g., sucrose, glucose, corn syrup and modified corn syrup), alcohols, phenols, and natural gums.

Typical ranges for using admixtures, such as set retarders, are within 0.01%-2.0%, and more preferably 0.02%-1.0%, based on weight of fly ash. The actual amount of admixtures will reside within the preferences of the formulator.

In further exemplary embodiments, water that is recovered as wash water recycled from washing out the mixing drum of concrete delivery trucks that have returned from delivery operations may be used for pre-hydrating the unponded fly ash (as well as for mixing with the Portland cement/fly ash composition). It is believed that such recycled water comprises 0%-2% by weight of Portland cement.

Hence, further methods of the invention comprise adding water to the pre-hydrated, unponded fly ash, and also to the mixing of the fly ash and Portland cement, so as to initiate hydration of said Portland cement.

In further exemplary embodiments, chloride salts and conventional chloride and non-chloride accelerators may be incorporated into exemplary Portland cement/fly ash cements made by the method of the invention. Exemplary non-chloride accelerators include (a) a nitrate salt of an alkali metal, alkaline earth metal, or aluminum; (b) a nitrite salt of an alkali metal, alkaline earth metal, or aluminum; (c) a thiocyanate of an alkali metal, alkaline earth metal, or aluminum; (d) an alkanolamine; (e) a thiosulphate of an alkali metal, alkaline earth metal, or aluminum; (f) a hydroxide of an alkali metal, alkaline earth metal, or aluminum; (g) a carboxylic acid salt of an alkali metal, alkaline earth metal, or aluminum; or, (h) a polyhydroxylalkylamine. Non-chloride accelerators mentioned in U.S. Pat. No. 6,008,275, for example at column 11, are believed to be suitable for use in the present invention and incorporated by reference.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples. All parts and percentages in the examples, as well as in the remainder of the specification, are by percentage weight unless otherwise specified.

Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: $R=RL+k*(RU-RL)$, where k is a variable ranging from 1% to 100% with a 1% increment, e.g., k is 1%, 2%, 3%, 4%, 5% ... 50%, 51%, 52% ... 95%, 96%, 97%, 98%, 99%, or 100%. Moreover, any numerical range represented by any two values of R, as calculated above, is also specifically disclosed.

Example 1

A Class C fly ash and ordinary Portland cement, with their respective chemical compositions determined by x-ray fluorescence, are shown in Table 1 below. The amount of free lime (in the form of calcium oxide) is determined by the Franke method. These materials were used to prepare Portland cement/fly ash mortar samples wherein the fly ash was pre-hydrated in accordance with the methods of the present invention. The mortar composition is further described in Table 2 following Table 1 below.

TABLE 1

| Chemical element | % weight | |
| --- | --- | --- |
| | Portland Cement | Class C Fly Ash |
| $SiO_2$ | 19.99 | 33.97 |
| $Al_2O_3$ | 4.77 | 18.26 |
| $Fe_2O_3$ | 3.04 | 6.38 |
| CaO | 62.83 | 27.46 |
| MgO | 3.81 | 4.68 |
| $SO_3$ | 2.89 | 2.64 |
| $Na_2O$ | 0.28 | 1.71 |
| $K_2O$ | 0.51 | 0.33 |
| $TiO_2$ | 0.25 | 1.55 |
| $P_2O_5$ | 0.07 | 1.19 |
| $Mn_2O_3$ | 0.07 | — |
| $Cr_2O_3$ | 0.02 | 0.01 |
| ZnO | 0.02 | 0.01 |
| BaO | — | 0.97 |
| Total | 99.64 | 100.15 |
| LOI (950° C.) | 1.00 | 0.64 |
| Free CaO | n/a | 0.36 |

Cement mortar components and prepared using the pre-hydrated fly ash are set forth in terms of weight percentages in Table 2. All such Portland cement/fly ash mortars had a water-to-(cement plus fly ash) ratio of 0.485. The amount (in grams) of water used for "pre-hydrating" the fly ash and added at fly ash slurry preparation is set forth under the heading "Slurry Water." The water-to-fly ash ratio in the fly ash slurry is set forth under the heading "Slurry w/fa." The amount (in grams) of water used for hydrating the Portland cement/fly ash mortar sample and added at mortar preparation is set forth under the heading "Mortar Water." The amount of plaster of Paris that is added to the mortar at the moment of mortar preparation is set forth under the heading "Mortar Plaster." The composition of these mortar samples is thus identified in Table 2.

TABLE 2

| Mortar | Cement (g) | Fly ash (g) | Slurry water (g) | Slurry w/fa | Mortar water (g) | Mortar plaster (g) |
|---|---|---|---|---|---|---|
| A | 325 | 325 | — | — | 315.3 | — |
| B | 325 | 325 | — | — | 315.3 | 11.7 |
| C | 325 | 325 | — | — | 315.3 | 23.4 |
| D | 325 | 325 | 260 | 0.8 | 55.3 | — |
| E | 325 | 325 | 260 | 0.8 | 55.3 | 11.7 |
| F | 325 | 325 | 260 | 0.8 | 55.3 | 23.4 |

It is to be noted that for mortars A, B, and C the fly ash was used in powder form (as obtained from supplier) and in a weight percentage of 50% of the total amount of cementitious materials (e.g., Portland cement and fly ash together). Water was added to the cementitious dry blend (following ASTM C305-99) at the moment of mortar preparation. Mortar samples B and C contain 1.8% and 3.6%, respectively, of sulfate added as calcium sulfate hemihydrate or plaster of Paris, the percentages being based on total weight of cementitious material.

As shown in Table 3 below, the addition of sulfate does not increase 1 day strength, but slightly increases strength at 7 and 28 days after mixing with water. Set times of the mortar samples as measured by isothermal calorimetry (see FIG. 3) are not affected by the addition of plaster (source of sulfate).

To prepare mortar samples D, E, and F in accordance with exemplary methods of the present invention, unponded fly ash was mixed with water in an amount of 80% based on weight of fly ash and allowed to rest in a sealed container for a period of 3 hours and 30 minutes before cement, sand, and additional water were added and mixed together with the fly ash. The rest of the mixing procedure followed ASTM C305-99 protocol. All mortars (samples "A" through "F") had the same water-to-cementitious-material ratio of about 0.485. All mortar samples were compacted using a vibrating table at 0.80 mm amplitude for three minutes with the molds being filled in two steps evenly distributed in the total vibration time.

TABLE 3

Compressive Strength and Set Times of Mortar Samples

| Mortar | 1 day (MPa) | 7 days (MPa) | 28 days (MPa) | Initial set time (hours) |
|---|---|---|---|---|
| A | 2.0 | 22.1 | 31.0 | 14 |
| B | 1.6 | 22.6 | 33.0 | 14 |
| C | 1.6 | 24.1 | 33.6 | 14 |
| D | 2.1 | 22.1 | 29.7 | 5 |
| E | 5.9 | 24.8 | 32.1 | 5 |
| F | 8.8 | 25.9 | 33.1 | 5 |

Table 3 above suggests that, when unponded class C fly ash is "pre-hydrated" in accordance with an exemplary method of the invention, no adverse impact on strength is manifested; but initial set times are significantly reduced, as evident in mortar sample "D" wherein the set time was reduced from 14 to 5 hours. When the fly ash is "pre-hydrated," additional sulfate is necessary for enhancing 1 day strength. In the present example, strength was increased from 2.1 to 8.8 MPa, which is a four-fold enhancement. Later age strength (e.g., at 7 and 28 days) is only slightly increased when additional sulfate is supplied to mortar samples having fly ash that has been pre-hydrated using the methods of the present invention.

Moreover, it is observed that initial set time is not affected by addition of sulfate, regardless of whether the fly ash is pre-hydrated or not.

Figure 3:
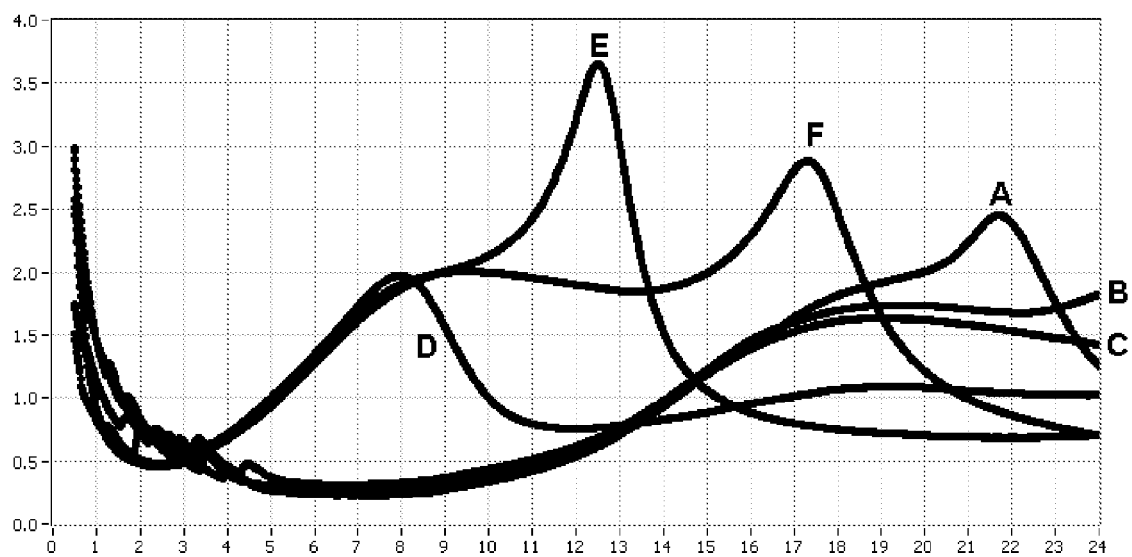
FIG. 3 is a graphic illustration of the effect of increasing sulfate content on hydration behavior, in terms of heat evolution over time, of two sets of Portland cement/fly ash blends (1:1 dry weight ratio), the first set containing non-"pre-hydrated" fly ash, the second set containing fly ash that is "pre-hydrated" in accordance with an exemplary method of the present invention.

The hydration behaviors of the six mortar samples A through F are graphically illustrated in FIG. 3. The heat evolution curves are expressed as miliwatt per gram of dry cementitious material (x axis) as a function of hydration time expressed in hours (y axis). Some of these mortar samples contain a source of sulfate, in the form of plaster of Paris added at the moment that the mortar blend is mixed with water to initiate hydration. The amount of plaster of Paris is indicated herein as a percentage of the total cementitious material (cement plus fly ash). Thus, mortar sample "A" contains non-pre-hydrated fly ash with no additional source of sulfate; and is designated as curve "A." Mortar sample "B" contains non-"pre-hydrated" fly ash and plaster of Paris (1.8%); and is designated as curve "B." Mortar sample "C" contains non-pre-hydrated fly ash and plaster of Paris (3.6%); and is designated as curve "C." Mortar sample "D" contains fly ash that is pre-hydrated for 24 hours and no additional sulfate source, and is designated as curve "D." Mortar sample "E" contains fly ash that is pre-hydrated for 24 hours and contains plaster of Paris (1.8%); and is designated as curve "E." Finally, mortar sample "F" contains fly ash that is pre-hydrated for 24 hours and plaster of Paris (3.6%); and this is designated as curve "F" in FIG. 3.

As illustrated in FIG. 3, the heat evolved from the hydration reaction of mortar samples A, B, and C (containing untreated fly ash in powder form mixed with Portland cement) begins to peak after about 10-11 hours after the samples are mixed with water. This hydration behavior provides remarkable contrast when compared to the heat evolution behavior of mortar samples D, E, and F (containing fly ash which is pre-hydrated before mixing with Portland cement) are mixed with water. This provides evidence that set time is accelerated by several hours by virtue of using fly ash that is pre-hydrated in accordance with the invention.

The heat evolution behavior of mortar samples D, E, and F, wherein sample "E" contained 1.8% of additional source of sulfate and sample "F" contained 3.6% of additional source of sulfate, also provides evidence that the use of an added source of sulfate provides for a hydration reaction profile that is more typical of the hydration behavior of Portland cement.

Example 2

In this example, the effect of pre-hydrating an unponded fly ash, before it is added to Portland cement which is, in turn, hydrated by addition of water, is further explored. The chemical composition of an ordinary Portland cement and a Class C fly ash (unponded) as determined through x-ray fluorescence is presented in Table 4 below. The amount of free lime (in the form of calcium oxide) is determined by the Franke method.

TABLE 4

| | % fly ash dry weight | |
|---|---|---|
| Element | Portland Cement | Class C Fly Ash |
| $SiO_2$ | 19.99 | 34.11 |
| $Al_2O_3$ | 4.77 | 17.99 |
| $Fe_2O_3$ | 3.04 | 6.24 |
| CaO | 62.83 | 26.99 |
| MgO | 3.81 | 5.52 |
| $SO_3$ | 2.89 | 3.01 |
| $Na_2O$ | 0.28 | 1.75 |
| $K_2O$ | 0.51 | 0.41 |
| $TiO_2$ | 0.25 | 1.35 |
| $P_2O_5$ | 0.07 | 1.05 |
| $Mn_2O_3$ | 0.07 | 0.03 |
| SrO | 0.08 | 0.3 |
| $Cr_2O_3$ | 0.02 | <0.01 |
| ZnO | 0.02 | 0.02 |
| BaO | — | 0.98 |
| Total | 99.64 | 100.22 |
| $Na_2O_{eq}$ total | 0.61 | 2.02 |
| LOI (950° C.) | 1.00 | 0.47 |
| Free CaO | n/a | 0.54 |

Components of Portland cement/fly ash mortar samples, containing fly ash pre-hydrated in accordance with the invention, are provided in Table 5. All of the Portland cement/fly ash mortars have a water-to-(cement plus fly ash) ratio of 0.50, and all such mortars contain 3.6% of cementitious (cement plus fly ash) weight of a source of sulfate (plaster of Paris) added at the moment that the Portland cement and pre-hydrated fly ash are mixed together. The amount (in grams) of water used for "pre-hydrating" the fly ash and preparing the fly ash slurry is set forth under the heading "Slurry Water." The amount (in grams) of water added to the Portland cement/fly ash mortar sample at the moment of mortar preparation is set forth under the heading "Mortar Water." The water-to-fly ash ratio in the fly ash slurry is set forth under the heading "Slurry w/fa." The time (in minutes) during which the fly ash is soaked (or "pre-hydrated" before blending with Portland cement) is set forth under the heading "Pre-hydration Time."

TABLE 5

Composition of Portland Cement/Fly Ash Mortars

| Mortar | Cement (g) | Fly Ash (g) | Plaster of Paris (g) | Slurry Water (g) | Mortar Water (g) | Slurry w/fa | Pre-hydration Time (min) |
|---|---|---|---|---|---|---|---|
| A | 225 | 225 | 16.2 | — | 225 | — | — |
| B | 225 | 225 | 16.2 | 180 | 45 | 0.8 | 180 |
| C | 225 | 225 | 16.2 | 135 | 90 | 0.6 | 180 |
| D | 225 | 225 | 16.2 | 90 | 135 | 0.4 | 180 |
| E | 225 | 225 | 16.2 | 67.5 | 157.5 | 0.3 | 180 |
| F | 225 | 225 | 16.2 | 45 | 180 | 0.2 | 180 |
| G | 225 | 225 | 16.2 | 22.5 | 202.5 | 0.1 | 180 |

Figure 4:
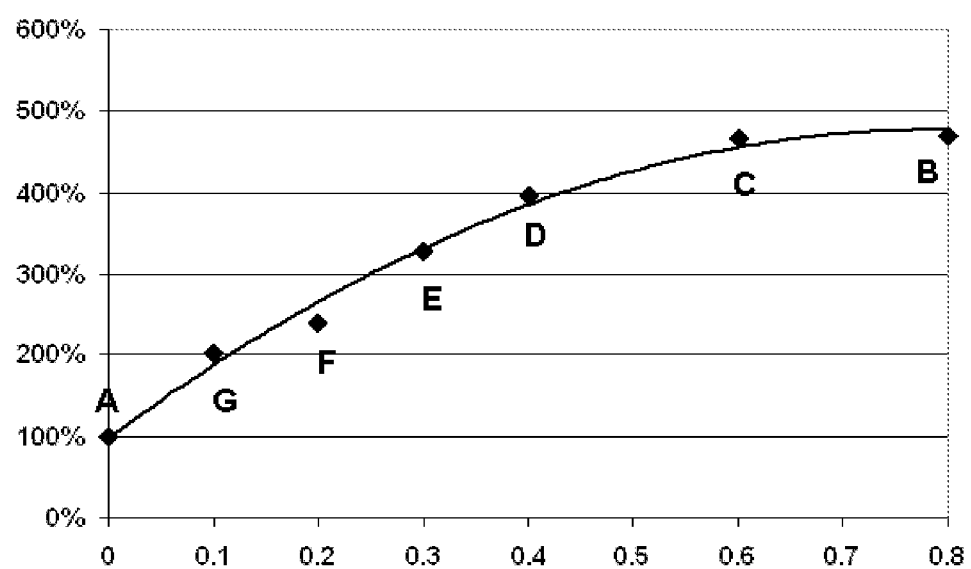
FIG. 4 is a graphic illustration of the effect of increasing water-to-fly-ash ratio (horizontal axis) against compressive strength (vertical axis) of Portland cement/fly ash blends (1:1 dry weight ratio), using a fly ash slurry wherein the fly ash is unponded and "pre-hydrated" in accordance with the present invention.

The data presented in Table 5 is graphically illustrated in FIG. 4.

In FIG. 4, the water-to-fly-ash (w/fa) ratio of the fly ash slurry (horizontal axis) is plotted against compressive strength (at 1 day) of Portland cement/fly ash mortar samples. The compressive strength values are reflected as a percentage of (and compared against) a reference mortar sample "A" which contains untreated fly ash (and thus w/fa=0 for this reference mortar sample designated at point "A"). Therefore, points G, F, E, D, C, and B in FIG. 4 illustrate an increasing compressive strength at 1 day for Portland cement/fly ash mortar samples prepared with increasing pre-hydrating-water-to-fly ash ratios (w/fa). FIG. 4 illustrates an increased enhancement of compressive strength at w/fa of 0.1 (point "G"), 0.2 (point "F"), 0.3 (point "E"), 0.4 (point "D"), 0.6 (point "C"), and 0.8 (point "B").

As shown in FIG. 4, beginning with point "A" which represents the control sample (untreated fly ash), an increase in compressive strength can be seen to correspond generally with the amount of water used for pre-hydrating the fly ash.

Hence, the present inventors believe that the amount of water used for "(pre-)hydrating" the fly ash has a significant impact on the early age strength of Portland cement/fly ash mortars made using pre-hydrated fly ash slurry: namely, the higher the water content, the higher the strength, until a plateau is reached. In the present example, this plateau was observed to start at a water-to-fly ash ratio of 0.6 to 0.8. In exemplary methods of the invention, therefore, it is preferred to pre-hydrate the fly ash using a pre-hydrating-water-to-fly-ash (w/fa) ratio of 0.1 to 0.8, and more preferably 0.4 to 0.6.

Performance data relating to the compressive strength of the mortar samples at 1, 2, and 28 days, along with initial set time in terms of hours: minutes, is set forth in Table 6.

TABLE 6

Compressive Strength and Set Times of Mortar Samples

| Mortar | 1 day (MPa) | 2 days (MPa) | 28 days (MPa) | Initial set time (hh:mm) |
|---|---|---|---|---|
| A | 2.1 | 7.4 | 31.4 | 13:45 |
| B | 10.0 | 16.7 | 39.8 | 5:45 |
| C | 9.9 | 16.6 | 39.9 | 5:45 |
| D | 8.4 | 16.2 | 38.6 | 6:15 |
| E | 7.0 | 16.1 | 37.8 | 6:15 |
| F | 5.1 | 14.0 | 33.6 | 4:30 |
| G | 4.3 | 10.3 | 30.2 | 4:30 |

It is further observed that when initial set times of mortar samples A through G are examined, the set time is only slightly affected by the amount of water used for pre-hydrating the fly ash.

Example 3

Further testing was done on Portland cement/fly ash mortar samples wherein ordinary Portland cement was mixed with various percentage portions of fly ash that is pre-hydrated in accordance with the present invention. The chemical composition of the mortars, determined by x-ray fluorescence, is presented in Table 7 below. Free lime in terms of CaO is determined by the Franke method.

TABLE 7

| | % Fly ash weight | |
|---|---|---|
| Element | Portland Cement | Class C Fly Ash |
| $SiO_2$ | 19.99 | 34.11 |
| $Al_2O_3$ | 4.77 | 17.99 |
| $Fe_2O_3$ | 3.04 | 6.24 |
| CaO | 62.83 | 26.99 |
| MgO | 3.81 | 5.52 |
| $SO_3$ | 2.89 | 3.01 |
| $Na_2O$ | 0.28 | 1.75 |
| $K_2O$ | 0.51 | 0.41 |
| $TiO_2$ | 0.25 | 1.35 |
| $P_2O_5$ | 0.07 | 1.05 |
| $Mn_2O_3$ | 0.07 | 0.03 |
| SrO | 0.08 | 0.3 |

TABLE 7-continued

| | % Fly ash weight | |
| Element | Portland Cement | Class C Fly Ash |
| --- | --- | --- |
| $Cr_2O_3$ | 0.02 | <0.01 |
| ZnO | 0.02 | 0.02 |
| BaO | — | 0.98 |
| Total | 99.64 | 100.22 |
| $Na_2O_{eq}$ total | 0.61 | 2.02 |
| LOI (950 C) | 1.00 | 0.47 |
| Free CaO | n/a | 0.54 |

The pre-hydrated fly ash is added to the mortars to replace 25%, 50%, 75%, and 100% of the Portland cement (the percentages being based on total Portland cement plus fly ash dry weight). The identification and percentage of mortar components are set forth in Table 8.

The water-to-(cement plus fly ash) ratio was 0.50, and all cement mortars contained 16.2 grams of a source of sulfate (e.g., plaster of Paris) which is added at the moment that the fly ash slurry is prepared. The amount of plaster of Paris (in grams) is set forth under the heading "Slurry Plaster". The amount (in grams) of water used for "pre-hydrating" the fly ash and preparing the fly ash slurry is set forth under the heading "Slurry Water." The amount (in grams) of water added at moment of preparation of the Portland cement/fly ash mortar sample is set forth under the heading "Mortar Water." The water-to-fly ash ratio in the fly ash slurry is set forth under the heading "Slurry w/fa." The time (in minutes) during which the fly ash is soaked (or "pre-hydrated" before hydration of the resultant Portland cement/fly ash mortar sample) is set forth under the heading "Pre-hydration Time."

TABLE 8

Composition of mortars

| Mortar Sample | Cement (g) | Fly Ash (g) | Slurry Plaster (g) | Slurry Water (g) | Mortar Water (g) | Slurry w/fa | Pre-hydration Time (min) |
| --- | --- | --- | --- | --- | --- | --- | --- |
| A | 450 | — | 16.2 | — | 225 | — | — |
| B | 337.5 | 112.5 | 16.2 | — | 225 | — | — |
| C | 225 | 225 | 16.2 | — | 225 | — | — |
| D | 112.5 | 337.5 | 16.2 | — | 225 | — | — |
| E | — | 450 | 16.2 | — | 225 | — | — |
| F | 337.5 | 112.5 | 16.2 | 33.8 | 191.2 | 0.3 | 120 |
| G | 225 | 225 | 16.2 | 67.5 | 157.5 | 0.3 | 120 |
| H | 112.5 | 337.5 | 16.2 | 101.3 | 123.7 | 0.3 | 120 |
| I | — | 450 | 16.2 | 135 | 90 | 0.3 | 120 |

The testing protocols adopted to prepare and test the mortars are described by the European standard EN-196 (1995). The mortar specimens were vibrated in a vibrating table. All mortars were submitted to isothermal calorimetry for the estimation of initial set times.

The compressive strength at 1, 2, and 28 days and the initial set times of the mortar samples A through I are summarized in Table 9.

TABLE 9

| Mortar Sample | 1 day (MPa) | 2 days (MPa) | 28 days (MPa) |
| --- | --- | --- | --- |
| A | 15.5 | 23.5 | 59.3 |
| B | 8.7 | 18.7 | 51.4 |
| C | 3.1 | 14.6 | 37.5 |
| D | 1.0 | 6.7 | 16.8 |
| E | 3.6 | 4.4 | 5.6 |
| F | 12.9 | 26.3 | 50.9 |
| G | 10.6 | 18.5 | 41.7 |
| H | 4.0 | 6.1 | 20.3 |
| I | 1.0 | 1.0 | 1.7 |

Figure 5:
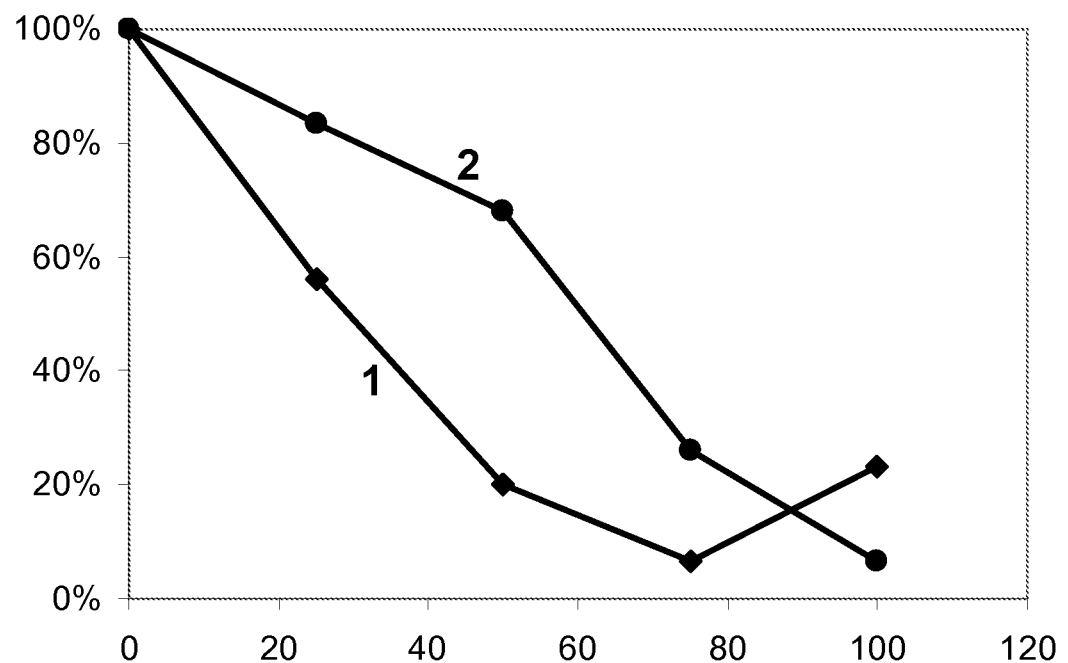
FIG. 5 is a graphic illustration of the effect of increasing fly ash percentage (horizontal axis) against compressive strength (vertical axis) of Portland cement/fly ash blends, wherein the first curve corresponds to a sample containing non-"pre-hydrated" fly ash and the second curve corresponds to a sample containing fly ash that is "pre-hydrated" in accordance with the present invention.

The compressive strength of mortar samples at 1 day, reflected as a percentage of the strength value for reference mortar sample A (containing only Portland cement) is illustrated in FIG. 5. The percentage amount of fly ash which substitutes cement in the mortar samples is indicated along the horizontal axis, while the percentage compressive strength of the sample, compared to the reference sample A, is indicated along the vertical axis. The compressive strength of mortar samples prepared with untreated fly ash is illustrated by curve "1"; whereas the compressive strength of mortar samples prepared with fly ash that is pre-hydrated for two hours with 30% water (based on dry weight of fly ash) and which includes plaster of Paris in the amount indicated in Table 8 above is illustrated by curve "2".

As shown in FIG. 5, the use of fly ash for partial or total replacement of Portland cement in a mortar typically decreases 1 day strength of the mortar, and hence mortars containing 80%-100% fly ash demonstrated approximately 30% or less of the strength of the reference mortar (Portland cement only; zero percent fly ash).

It is interesting to observe that for the mortar sample containing 50% untreated fly ash (curve 1) the strength was about 20% that of the reference sample which contained no fly ash. But for the mortar sample containing 50% of fly ash that was pre-hydrated (curve 2), the compressive strength is seen to be about 70% as compared to the reference sample which contained no fly ash.

Example 4

The present example illustrates the performance of mortars prepared with fly ash pre-hydrated with 10% water (water-to-fly ash weight ratio of 0.10) steamed in a chamber. The ordinary Portland cement and Class C fly ash used in this example are the same as the ones used in Example 3 (See Table 1 of Example 3 for chemical composition of cement and fly ash). The composition of the mortar samples is set forth in Table 10 below.

The water-to-(cement plus fly ash) ratio was 0.50, and all cement mortars contained 16.2 grams of a source of sulfate (e.g., plaster of Paris) which is added at the moment that the mortar is prepared. The amount (in grams) of water steamed over a bed of fly ash for 45 minutes is set forth under the heading "Steamed Water." The amount (in grams) of water used for hydrating the Portland cement/fly ash mortar sample and added at the moment of mortar preparation is set forth under the heading "Mortar Water." The water-to-fly ash ratio in the steamed fly ash is set forth under the heading "Steamed w/fa." The time (in minutes) during which the fly ash is steamed (or "pre-hydrated" before hydration of the resultant Portland cement/fly ash mortar sample) is set forth under the heading "Pre-hydration Time."

TABLE 10

Composition of mortars

| Mortar Sample | Cement (g) | Fly ash (g) | Plaster of Paris (g) | Steamed Water (g) | Steamed w/fa | Mortar Water (g) | Pre-hydration Time (min) |
|---|---|---|---|---|---|---|---|
| A | 225 | 225 | 16.2 | — | — | 225 | — |
| B | 225 | 225 | 16.2 | 26.0 | 0.1 | 202.5 | 45 |

The performance of the mortar samples, in terms of initial set times measured by isothermal calorimetry and in terms of compressive strength, is set forth in Table 11 below. Steaming the fly ash as a way to pre-hydrate it (mortar B) enhanced 1 day strength and reduced set time.

TABLE 11

Compressive strength and set times of mortars

| Mortar Sample | 1 day (MPa) | 2 days (MPa) | 28 days (MPa) | Initial set time (hh:mm) |
|---|---|---|---|---|
| A | 2.6 | 13.2 | 36.5 | 12:00 |
| B | 6.9 | 15.8 | 35.3 | 3:45 |

Example 5

The effects of fly ash pre-hydration and of adding a source of sulfate (e.g., plaster of Paris) are investigated on concrete samples containing fly ash and ordinary Portland cement in a 1:1 weight ratio to provide the Portland cement/fly ash binder, and the concrete was made by incorporating fine aggregate (sand) and coarse aggregate (crushed gravel). The identification and percentage of fly ash and Portland cement components, as determined by x-ray fluorescence, are set forth in Table 12. Free lime content (expressed in terms of CaO) is determined by the Franke method.

TABLE 12

| | % Fly ash weight | | |
|---|---|---|---|
| Element | Portland Cement | Fly Ash 1 | Fly Ash 2 |
| $SiO_2$ | 19.99 | 34.11 | 34.12 |
| $Al_2O_3$ | 4.77 | 17.99 | 18.31 |
| $Fe_2O_3$ | 3.04 | 6.24 | 6.13 |
| CaO | 62.83 | 26.99 | 27.21 |
| MgO | 3.81 | 5.52 | 4.65 |
| $SO_3$ | 2.89 | 3.01 | 2.61 |
| $Na_2O$ | 0.28 | 1.75 | 1.69 |
| $K_2O$ | 0.51 | 0.41 | 0.32 |
| $TiO_2$ | 0.25 | 1.35 | 1.56 |
| $P_2O_5$ | 0.07 | 1.05 | 1.15 |
| $Mn_2O_3$ | 0.07 | 0.03 | 0.04 |
| SrO | 0.08 | 0.3 | 0.29 |
| $Cr_2O_3$ | 0.02 | <0.01 | <0.01 |
| ZnO | 0.02 | 0.02 | 0.01 |
| BaO | — | 0.98 | |
| Total | 99.64 | 100.22 | 98.87 |
| $Na_2O_{eq}$ total | 0.61 | 2.02 | 1.90 |
| LOI (950° C.) | 1.00 | 0.47 | 0.77 |
| Free CaO | n/a | 0.54 | 0.18 |

Compositional data regarding concrete compositions made with the two different Class C fly ashes are set forth in Table 13 below. All concrete mixes were made using water-to-(cement plus fly ash) ratio of 0.45. All samples also contained 0.1% active high range water reducer, in this case a polycarboxylate dispersant available from Grace Construction Products, Cambridge, Mass., under the trade name ADVACAST® 575 (the percentage based on weight of cement plus fly ash, by dry weight). All of the concrete mixes contained the following amounts of materials: Portland cement (5,369 grams), Class C fly ash (5,369 grams), sand (27,274 grams), coarse aggregate (30,033 grams), water (total 4,832 grams). The amount of water (grams) added for pre-hydrating the fly ash and added at the moment of fly ash slurry preparation is indicated under the heading "Slurry Water." The time during which the fly ash is soaked is indicated under the heading "Pre-hydration Time." The amount of water added to the concrete at the time of concrete preparation is indicated under the heading "Concrete Water." The amount of soluble sulfate added in the form of plaster of Paris at the moment of fly ash slurry preparation is indicated under the heading "Slurry Plaster." The amount of soluble sulfate added in the form of plaster of Paris at the moment of concrete preparation is indicated under the heading "Concrete Plaster."

TABLE 13

Composition prepared using two different Class C fly ashes.

| Fly Ash | Concrete sample | Slurry water (g) | Pre-hydration time (min) | Concrete water (g) | Slurry plaster (g) | Concrete plaster (g) |
|---|---|---|---|---|---|---|
| 1 | 1A | — | — | 4832 | — | — |
|   | 1B | — | — | 4832 | — | 386.6 |
|   | 1C | 2148 | 30 | 2684 | — | 386.6 |
|   | 1D | 2148 | 30 | 2684 | 386.6 | — |
| 2 | 2A | — | — | 4832 | — | 386.6 |
|   | 2B | 2148 | 1140 | 2672 | — | 386.6 |
|   | 2C | 2148 | 1140 | 2672 | 386.6 | — |
|   | 2D | 2148 | 300 | 2684 | — | 386.6 |
|   | 2E | 2148 | 300 | 2684 | 386.6 | — |

According to Table 14, the use of pre-hydrated fly ash is seen to enhance 1 day strength by at least 3.6 times for fly ash "1" and by at least 2.4 times for fly ash "2." The fly ashes remained immersed in contact with water for different amounts of time before the preparation of the concrete mixes (30 minutes for fly ash 1; 1140 minutes and 300 minutes for fly ash 2).

The present inventors also determined that pre-hydration of fly ash can reduce workability of the resultant Portland fly ash cement mixes when addition of sulfate is made in the concrete mixing step. This behavior is evidenced by mix samples 1C, 2B, and 2D in Table 14, which describes slump, initial and final set time (hours/minutes), and compressive strength at 1, 2, and 28 days. This behavior is believed to be due to consumption of water by hydration reactions occurring in the fly ash before concrete preparation. However, the addition of a source of sulfate to the pre-treatment of fly ash partially or totally recovers the slump, and hence workability, of the concrete, as demonstrated by concrete samples 1D, 2C, and 2E in Table 14.

In terms of strength enhancement and set time reduction, the results in Table 14 supports the conclusion that addition of a source of sulfate during the fly ash hydration step could negatively impact both performances as seen in mixes 1D and 2E when the fly ash pre-hydrations are not allowed to run to completion. When the fly ash hydration is allowed to fully react, as demonstrated in Mix 2C, strength and set times are optimized.

TABLE 14

| Fly Ash | Concrete | Slump (cm) | Initial set time (hh:mm) | Final set time (hh:mm) | 1 day strength (MPa) | 2 days strength (MPa) | 28 days strength (MPa) |
|---|---|---|---|---|---|---|---|
| 1 | 1A | 22.2 | 13:43 | 23:24 | 2.1 | 5.1 | 25.5 |
|   | 1B | 21.0 | 15:04 | 25:25 | 3.2 | 10.9 | 28.5 |
|   | 1C | 8.9 | 7:19 | 11:16 | 8.4 | 12.2 | 30.5 |
|   | 1D | 20.3 | 10:38 | 14:44 | 7.5 | 11.6 | 30.0 |
| 2 | 2A | 19.7 | 12:47 | 20:06 | 3.1 | 10.3 | 27.0 |
|   | 2B | 7.0 | 5:00 | 9:14 | 7.4 | 10.3 | 27.5 |
|   | 2C | 12.7 | 4:59 | 9:06 | 7.3 | 10.3 | 26.3 |
|   | 2D | 11.4 | 5:22 | 8:51 | 7.5 | 11.4 | 27.9 |
|   | 2E | 19.7 | 6:44 | 11:11 | 4.9 | 10.8 | 26.9 |

Therefore, it is a preferred embodiment of the present invention to combine a source of soluble sulfate (e.g., plaster of Paris) to fly ash before or during its pre-hydration in accordance with the present invention, and thus before the pre-treated fly ash is combined with Portland cement to form a Portland cement/fly ash composition that is subsequently hydrated. The sulfate addition to fly ash and water before adding Portland cement is preferred in order to ensure that ettringite is the most stable aluminate hydrated formed, thereby improving the performance of any water reducing admixture used in the resultant Portland cement/fly ash composition. Any deficiency in soluble sulfate occurring when the fly ash is pre-hydrated may result in the formation of what is known in the art as AFm phases, which are known to cause loss of dispersant efficiency in concrete Example 6

Five Class C fly ash samples designated as Fly Ash 1 through 5 were tested for the effect of the pre-hydration and for the effect of adding a source of soluble sulfate (e.g., plaster of Paris) and a source of carbon (e.g., sodium bicarbonate). Sodium bicarbonate was mixed into fly ash slurry one hour after the slurry was prepared, and the total fly ash slurry soaking (or pre-hydration) time was two hours and thirty minutes. A Portland cement/fly ash mortar was prepared by mixing the fly ash slurry with Portland cement and sand, and plaster of Paris was added at the moment the cement mortar was prepared.

The chemical composition of an ordinary Portland cement and five Class C fly ashes (unponded) as determined through x-ray fluorescence is presented in Table 15. The amount of free lime, expressed in the form of calcium oxide based on weight of total cementitious material, is determined by the Franke method.

TABLE 15

| | % Dry weight | | | | | |
|---|---|---|---|---|---|---|
| Chemical Element | Portland Cement | Fly Ash 1 | Fly Ash 2 | Fly Ash 3 | Fly Ash 4 | Fly Ash 5 |
| $SiO_2$ | 19.99 | 33.97 | 36.02 | 34.28 | 34.11 | 34.25 |
| $Al_2O_3$ | 4.77 | 18.26 | 19 | 18.46 | 17.99 | 17.51 |
| $Fe_2O_3$ | 3.04 | 6.38 | 6.58 | 6.85 | 6.24 | 6.03 |
| CaO | 62.83 | 27.46 | 24.2 | 25.74 | 26.99 | 27.09 |
| MgO | 3.81 | 4.68 | 5.14 | 5.52 | 5.52 | 6.82 |
| $SO_3$ | 2.89 | 2.64 | 1.81 | 2.38 | 3.01 | 2.08 |
| $Na_2O$ | 0.28 | 1.71 | 1.89 | 2.00 | 1.75 | 1.9 |
| $K_2O$ | 0.51 | 0.33 | 0.47 | 0.44 | 0.41 | 0.41 |
| $TiO_2$ | 0.25 | 1.55 | 1.47 | 1.52 | 1.35 | 1.31 |
| $P_2O_5$ | 0.07 | 1.19 | 1.22 | 1.19 | 1.05 | 1.1 |
| $Mn_2O_3$ | 0.07 | 0.04 | 0.02 | 0.02 | 0.03 | 0.02 |
| SrO | 0.08 | 0.3 | 0.23 | 0.25 | 0.3 | 0.3 |

TABLE 15-continued

| | % Dry weight | | | | | |
|---|---|---|---|---|---|---|
| Chemical Element | Portland Cement | Fly Ash 1 | Fly Ash 2 | Fly Ash 3 | Fly Ash 4 | Fly Ash 5 |
| $Cr_2O_3$ | 0.02 | 0.01 | <0.01 | <0.01 | <0.01 | <0.01 |
| ZnO | 0.02 | 0.01 | 0.02 | 0.02 | 0.02 | 0.02 |
| BaO | — | 0.97 | — | 1.00 | 0.98 | 0.99 |
| Total | 99.64 | 100.15 | 98.34 | 100.03 | 100.22 | 100.09 |
| $Na_2O_{eq}$ total | 0.61 | 1.93 | 2.20 | 2.28 | 2.02 | 2.17 |
| LOI (950° C.) | 1.00 | 0.64 | 0.28 | 0.37 | 0.47 | 0.25 |
| Free CaO | n/a | 0.36 | 0.60 | 0.35 | 0.54 | 0.30 |

The compositions of the various Portland cement/fly ash mortar samples, prepared using five different Class C fly ashes, are summarized in Table 16. Mortar A does not contain fly ash. Mortars series B, C, and D contain 20, 35, and 50% fly ash (the percentages based on dry weight of Portland cement plus fly ash), respectively. Mortars series E contains 50% fly ash that has been pre-hydrated for 2 hours and 30 minutes; the fly ash slurry in series E contains sodium bicarbonate added 1 hour after mixing fly ash and water; mortars series E also contain additional sulfate added as plaster of Paris. All mortars, regardless the amount of Portland cement, fly ash, and other admixtures, have a water-to-cementitious-materials ratio of 0.485. The amount of water (in grams) added for pre-hydrating the fly ash and added at the moment of fly ash slurry preparation is indicated under the heading "Slurry Water." The amount of a source of carbon (in grams) added in the form of sodium bicarbonate at the moment of fly ash slurry preparation is indicated under the heading "Slurry $NaHCO_3$." The time during which the fly ash is soaked in hours:minutes (hh:mm) is indicated under the heading "Pre-hydration Time." The amount of water (in grams) added to the mortar at the time of mortar preparation is indicated under the heading "Mortar Water." The amount of soluble sulfate (in grams) added in the form of plaster of Paris at the moment of mortar preparation is indicated under the heading "Mortar Plaster."

TABLE 16

| Fly Ash | Mortar | Cement (g) | Fly Ash (g) | Slurry Water (g) | Slurry $NaHCO_3$ (g) | Mortar Water (g) | Mortar Plaster (g) |
|---|---|---|---|---|---|---|---|
| — | A | 650 | — | — | — | 315.3 | — |
| 1 | 1B | 520 | 130 | — | — | 315.3 | — |
|   | 1C | 422.5 | 227.5 | — | — | 315.3 | — |
|   | 1D | 325 | 325 | — | — | 315.3 | — |
|   | 1E | 325 | 325 | 315.3 | 3.25 | — | 23.4 |
| 2 | 2B | 520 | 130 | — | — | 315.3 | — |
|   | 2C | 422.5 | 227.5 | — | — | 315.3 | — |

TABLE 16-continued

| Fly Ash | Mortar | Cement (g) | Fly Ash (g) | Slurry Water (g) | Slurry NaHCO₃ (g) | Mortar Water (g) | Mortar Plaster (g) |
|---|---|---|---|---|---|---|---|
|   | 2D | 325 | 325 | — | — | 315.3 | — |
|   | 2E | 325 | 325 | 315.3 | 3.25 | — | 23.4 |
| 3 | 3B | 520 | 130 | — | — | 315.3 | — |
|   | 3C | 422.5 | 227.5 | — | — | 315.3 | — |
|   | 3D | 325 | 325 | — | — | 315.3 | — |
|   | 3E | 325 | 325 | 315.3 | 3.25 | — | 23.4 |
| 4 | 4B | 520 | 130 | — | — | 315.3 | — |
|   | 4C | 422.5 | 227.5 | — | — | 315.3 | — |
|   | 4D | 325 | 325 | — | — | 315.3 | — |
|   | 4E | 325 | 325 | 315.3 | 3.25 | — | 23.4 |
| 5 | 5B | 520 | 130 | — | — | 315.3 | — |
|   | 5C | 422.5 | 227.5 | — | — | 315.3 | — |
|   | 5D | 325 | 325 | — | — | 315.3 | — |
|   | 5E | 325 | 325 | 315.3 | 3.25 | — | 23.4 |

Performance data of the mortar samples identified in Table 16 is presented in terms of compressive strength at 1, 7, and 28 days and initial set times (hours: minutes) as determined by isothermal calorimetry in Table 17. The mixing procedure followed the ASTM C109 (2005) protocol. All mortar samples were compacted using a vibrating table at 0.80 mm amplitude during 3 minutes, with the molds being filled in two steps evenly distributed in the total vibration time.

TABLE 17

| Fly Ash | Mortar | 1 day (MPa) | 7 day (MPa) | 28 day (MPa) | Initial set time (hh:mm) |
|---|---|---|---|---|---|
| — | A | 18.0 | 42.2 | 52.2 | 2:30 |
| 1 | 1B | 14.3 | 40.1 | 49.3 | 5:30 |
|   | 1C | 7.8 | 32.5 | 43.4 | 8:15 |
|   | 1D | 2.8 | 22.5 | 30.1 | 13:15 |
|   | 1E | 12.7 | 29.0 | 38.5 | 5:00 |
| 2 | 2B | 13.6 | 39.6 | 53.1 | 5:00 |
|   | 2C | 7.7 | 28.7 | 40.0 | 7:45 |
|   | 2D | 2.8 | 17.0 | 25.7 | 11:00 |
|   | 2E | 8.7 | 24.1 | 32.9 | 5:15 |
| 3 | 3B | 13.6 | 38.7 | 51.3 | 4:45 |
|   | 3C | 7.7 | 29.1 | 38.0 | 7:30 |
|   | 3D | 3.1 | 20.2 | 28.7 | 11:30 |
|   | 3E | 10.8 | 29.1 | 38.6 | 5:00 |
| 4 | 4B | 13.6 | 38.6 | 50.3 | 5:00 |
|   | 4C | 7.6 | 31.5 | 40.1 | 8:00 |
|   | 4D | 3.1 | 21.2 | 31.3 | 13:30 |
|   | 4E | 12.2 | 29.1 | 41.4 | 5:00 |
| 5 | 5B | 12.6 | 37.3 | 48.1 | 5:30 |
|   | 5C | 6.2 | 28.6 | 43.9 | 9:00 |
|   | 5D | 1.4 | 18.9 | 25.9 | 15:00 |
|   | 5E | 10.8 | 30.2 | 40.5 | 6:30 |

Table 17 shows that the treatment applied to the fly ashes importantly increased the 1 day strength of mortars containing 50% fly ash (the percentage based on dry total weight of Portland cement plus fly ash), as well as decreased the set times by several hours. The treatment allowed a 50% fly ash mortar to have similar early age performance to a 20%-35% fly ash mortar.

The treatment is also beneficial to 7 and 28 days strengths, although to a lesser extent.

The foregoing example and embodiments are presented for illustrative purposes only and not intended to limit the scope of the invention.

We claim:

1. A method for making a blended fly ash Portland cement composition, comprising:
    mixing together (A) Portland cement and (B) pre-hydrated, unponded fly ash in a cement to fly ash ratio (C:FA) of 95:5 to 21:79 by dry weight to obtain a mix; the Portland cement and pre-hydrated, unponded fly ash mix comprising a source of soluble sulfate in an amount sufficient to sustain hydration of the Portland cement when water is added to the mix to initiate hydration of the Portland cement;
    pre-hydrated, unponded fly ash having a total alkaline earth metal content, when expressed in terms of molar equivalent of calcium oxide, of at least 10% based on total weight of the fly ash; and the pre-hydrated, unponded fly ash being pre-hydrated
    (i) by mixing the unponded fly ash in a body of water to obtain a fly ash slurry, the amount of the body of water being at least 10% by weight of the fly ash to allow partial or total dissolution of unhydrated, reactive calcium aluminate-containing phases and partial or total precipitation of calcium-containing hydrates; and
    (ii) allowing the fly ash to soak in the body of water, being at least 10% by weight of the fly ash, to allow the water-soaking fly ash to undergo peak exothermic reaction generated by the partial or total dissolution of reactive calcium aluminate-containing phases and partial or total precipitation of calcium-containing hydrates within the body of soaking water.

2. The method of claim 1 further comprising adding a source of soluble sulfate to the mixing of the Portland cement and the pre-hydrated unponded fly ash.

3. The method of claim 2 further wherein the source of soluble sulfate is added during or before the mixing together the pre-hydrated, unponded fly ash and Portland cement.

4. The method of claim 3 wherein the source of soluble sulfate is added to the pre-hydrated, unponded fly ash before the pre-hydrated, unponded fly ash is mixed with the Portland cement.

5. The method of claim 1 wherein the Portland cement is mixed with the pre-hydrated, unponded fly ash slurry which contains the water used for the pre-hydration of the fly ash.

6. The method of claim 5 further comprising adding additional water to achieve mixing of the Portland cement with pre-hydrated, unponded fly ash.

7. The method of claim 1 further comprising adding at least one set retarder into the blended fly ash Portland cement.

8. The method of claim 7 where the at least one set retarder is added to the fly ash, in pre-hydrated or slurry form, before the fly ash slurry is mixed with the Portland cement and before the fly ash undergoes peak exothermic reaction when water-soaked.

9. The method of claim 7 wherein the at least one set retarder is selected from the group consisting of gluconic acids and their salts, glucoheptonic acids and their salts, citric acids and their salts, tartaric acid and their salts, lignosulfonic acids and their salts, acetic acids and their salts, carbonic acids and their salts, boric acids and their salts, phosphonic acids and their salts, lactic acids and their salts, sulfonic acids and their salts, thiosulfonic acids and their salts, benzoic acids and their salts, sugars, and starches.

10. The method of claim 1 wherein, after the fly ash is soaked in the dissolving water for the duration of time sufficient to allow the water-soaking fly ash to undergo peak exothermic reaction generated by the partial or total dissolution of reactive calcium aluminate-containing phases and partial or total precipitation of calcium-containing hydrates, the dissolving water in the fly ash slurry is removed through evaporation by application of heat at a point in time after precipitation of calcium-containing hydrates is initiated, whereby the pre-hydrated, unponded fly ash is mixed with the Portland cement in the form of dry particles.

11. The method of claim 10 further comprising adding a source of soluble sulfate before or during mixing together of Portland cement and the pre-hydrated, unponded fly ash.

12. The method of claim 1 further comprising adding a source of soluble carbon into the mixing of the pre-hydrated, unponded fly ash and the Portland cement.

13. The method of claim 12 wherein the source of soluble carbon is a carbonate, a bicarbonate, or mixture thereof.

14. The method of claim 13 wherein the source of soluble carbon is alkaline earth bicarbonate selected from the group consisting of sodium bicarbonate and potassium bicarbonate.

15. The method of claim 13 wherein the source of soluble carbon is carbon dioxide.

16. The method of claim 1 wherein alkaline earth metal comprises calcium, magnesium, or mixture thereof.

17. The method of claim 1 wherein the mixing, the pre-hydrating, or both, occur at ambient or heated temperature.

18. The method of claim 1 wherein the pre-hydrating of unponded fly ash occurs at ambient temperature.

19. The method of claim 1 wherein the mixing of the Portland cement and the pre-hydrated, unponded fly ash further comprises an admixture selected from the group consisting of a cement dispersant, a superplasticizer, a shrinkage reducing admixture, a viscosity-modifying admixture, a corrosion inhibiting admixture, an air entraining agent, an air detraining agent, a set accelerating agent, a set retarding agent, or mixture thereof.

20. The method of claim 1 wherein, in the pre-hydrating of the unponded fly ash with water to obtain a fly ash slurry, the water or portion of the water is recovered as wash water recycled from washing out the mixing drum of concrete delivery trucks, and the water or portion of the water contains 0%-2% by weight of Portland cement.

21. The method of claim 1 further comprising adding water to the pre-hydrated, unponded fly ash and Portland cement to initiate hydration of the Portland cement.

22. The method of claim 1 wherein the pre-hydrating of the unponded fly ash involves fly ash having 0-15% free lime by dry weight.

* * * * *